(12) United States Patent
Elliott

(10) Patent No.: US 10,959,435 B1
(45) Date of Patent: *Mar. 30, 2021

(54) URINE NEUTRALIZATION AND CONVERSION SYSTEM AND METHOD

(71) Applicant: INVENTIVE OUTDOORS, LLC, Woodbridge, VA (US)

(72) Inventor: Deane Owen Elliott, Woodbridge, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/656,704

(22) Filed: Oct. 18, 2019

Related U.S. Application Data

(63) Continuation-in-part of application No. 16/375,185, filed on Apr. 4, 2019.

(51) Int. Cl.
*A01N 63/10* (2020.01)

(52) U.S. Cl.
CPC .................. *A01N 63/10* (2020.01)

(58) Field of Classification Search
CPC .............................. A47K 11/035; A01N 63/10
USPC ............................... 4/459, 460, 144.1
See application file for complete search history.

(56) References Cited

U.S. PATENT DOCUMENTS

| | | | |
|---|---|---|---|
| 4,042,337 A * | 8/1977 | Griffith | A61B 10/007 4/144.1 |
| 6,129,892 A | 10/2000 | Garrett | |
| 7,549,396 B2 | 6/2009 | Hurwitz et al. | |
| 2005/0199740 A1 | 9/2005 | Harris, Jr. | |
| 2009/0151216 A1 | 6/2009 | Haggerty | |
| 2016/0174569 A1* | 6/2016 | Maruyama | A01N 63/10 43/3 |

* cited by examiner

*Primary Examiner* — Tuan N Nguyen
(74) *Attorney, Agent, or Firm* — Patent Law Associates

(57) ABSTRACT

A system and method for collecting urine from a source, neutralizing the urine in the container with a neutralizing composition to remove or alter odor-generating compounds in the urine that might be perceived as threatening to prey, and then disposing of the neutralized urine in a convenient location proximate to the hunting area without repelling or alarming potential prey that might encounter the neutralized liquid. The neutralizing composition comprises a compound including a weak acidic or oxidizing component and a weak alkaline or base component, the combination reacting with and neutralizing odor-generating compounds and leaving the resulting neutralized urine with a relatively neutral pH value. The system and method further include adding compounds to impart a scent or odor to the neutralized urine, including a cover scent, such as pine essence, or an attractant scent, such as doe estrous, or a repellant scent.

8 Claims, 2 Drawing Sheets

URINE NEUTRALIZATION AND CONVERSION SYSTEM AND METHOD

CROSS-REFERENCE TO RELATED APPLICATIONS

This application is a continuation in part of U.S. application Ser. No. 16/375,185 filed on Apr. 4, 2019.

BACKGROUND OF THE INVENTION

The present invention relates generally to urine scent covering and, more particularly, to a conversion system for urine to mask odors perceived as predatory by intended prey and, optionally, to add an attractant or cover smell to the converted urine.

It is widely understood that animals such as dogs, bears, deer and others have a much better developed sense of smell than that of humans. Bears, for example, are believed to have a sense of smell over 2,000 times better than humans due to the number of olfactory sensors. A bear's sense of smell is believed to be 7 times better than that of a bloodhound. A dog's sense of smell is believed to be 100 times better than that of a human with a bloodhound being 300 times better. It is believed that a deer's sense of smell is 500-1,000 times more accurate than the human sense of smell.

Human urine, like that of other mammals, has a distinct smell that is easily detected by animals such as deer, bears, coyotes and other animals with a keen sense of smell. Most animal species prefer to avoid interactions with humans, so the smell of human urine tends to repel most animals. For many years, man has been using artificial and natural scents to mask, attract and repel animals when attempting to harvest them by hunting. For instance, deer hunters have used bottled fox urine placed around their hunting stand to cover or mask their own scent. Likewise, hunters have also used harvested animal urine such as urine harvested from does in captivity when they are in estrus in order to attract nearby male deer (bucks). Bucks seeking to mate with does in estrus will often be attracted to doe urine placed by a hunter near his/her hunting location.

One of the challenges when hunting or doing other outdoor activities is what a hunter or other person does to contain the scent of his/her urine while conducting the activities. If a hunter is in his/her stand, he or she does not want to leave the stand in order to urinate. One solution to this has been to carry a portable receptacle into which the hunter urinates for later disposal. The problem with this is that the hunter must then carry the receptacle containing the urine out of the woods for later disposal. The receptacle can leak and thereby cause a mess while defeating the purpose of urinating in the container.

Another activity with similar challenges is that of a soldier seeking to remain undetected in the woods. For instance, a soldier that is attempting to sneak into a particular location without being detected in order to gain intelligence information, or a sniper sneaking into a shooting location would not want to be detected by a dog smelling his/her urine. These operations can take days to conduct, thereby eliminating the option of not urinating.

There are also times when urine can be used as a deterrent to repel other animals. For instance, it may be desired to repel deer from a particular area (gardens, etc.) using a coyote urine scent. In this instance, it would be useful to convert human urine to a deterrent for coyotes since deer often become used to the smell of humans in urban environments and the like.

Chronic Wasting Disease (CWD) is a central nervous system breakdown that affects white-tail deer populations. It is spread from animal to animal though direct contact or though contact with saliva, urine, feces, blood, and body parts of infected deer. Several states in which CWD is a significant concern have banned the use of deer urine in scents and attractants as a means to control or limit the spread of the disease. As incidence of CWD increase, many states have banned the use of natural deer urine as an attractant. Producers of deer attractants based on collected deer urine could utilize non-CWD carrying alternative supplies of animal urine if a process is identified for eliminating predatory or other undesirable scents from the alternative urine that might repel deer or interfere with synthetic attractants that might be added to the alternative urine.

It would be advantageous to provide a system for treating urine, whether human or another animal, to neutralize chemical constituents contained in the urine so that deer or other prey are not alarmed or repelled by the odor of the neutralized urine. Additional advantages would be realized if the neutralized urine could be further treated to enhance the scent using an attractant or cover scent that would not alarm potential prey encountering the neutralized and treated urine. A portable system would benefit hunters who could neutralize and treat their own urine and subsequently discharge it into a hunting area without repelling their prey, eliminating the need to transport their waste outside of the hunting area. Providing an attractant that could be added to neutralized urine offers additional utility by transforming what was a waste product into an animal attractant. Still further advantages would be realized by a process that allows substitution of urine from other non-CWD susceptible animal species for deer urine in deer attractant formulations.

SUMMARY OF THE INVENTION

Accordingly, the present invention, in any of the embodiments described herein, may provide one or more of the following advantages:

It is an object of the present invention to provide a system for collecting urine from a hunter and containing the urine in a container, neutralizing the urine in the container with a neutralizing composition to remove or alter odor-generating compounds in the urine that might be perceived as threatening to prey, and then disposing of the neutralized urine in a convenient location proximate to the hunting area without repelling or alarming potential prey that might encounter the neutralized liquid. The neutralizing composition comprises a compound including a weak acidic or oxidizing component and a mild basic component, the combination reacting with and neutralizing odor-generating compounds and leaving the resulting neutralized solution with a relatively neutral pH value.

It is another object of the present invention to provide a system for collecting and neutralizing urine from a hunter and enhancing the neutralized liquid with a scent or odor that masks the scent of the neutralized liquid with a cover scent, such as pine essence, or an attractant scent, or a repellant scent. Once the neutralized liquid is enhanced, the enhanced liquid may be dispersed in hunting areas at the hunter's discretion to attract or repel certain species or simply to permit disposal of urine waste without disturbing potential prey that encounter the liquid.

It is another object of the present invention to provide a system for collecting, neutralizing, and enhancing urine from a hunter for subsequent use by the hunter as an attractant for prey which allows the hunter's own urine to supply the necessary liquid for the attractant thereby reducing the need for the hunter to transport attractant in liquid form to the hunting location. The system includes a collection container capable of processing up to sixteen ounces of urine and two small (approximately 1-2 fluid ounces each) containers of chemicals for neutralizing and enhancing up to 16 ounces of urine. Since the collection container is transported empty, the hunter need only to carry only the weight of the empty collection container and the two small containers of additive materials.

It is a further object of the present invention to provide a system for collecting, neutralizing, and enhancing urine from a hunter for subsequent use by the hunter as an attractant for prey. By using individual hunters' urine to supply the necessary fluid for the attractant, each batch is attractant has a unique scent owing to variations in each individual's body chemistry. Even though many of the scent markers identify the urine as human are neutralized, numerous proteins remain providing subtle variations in the scent between batches.

It is a still further object of the present invention to provide a method for altering the scent of urine to first neutralize one or more constituents therein that may be perceived as threatening by an intended prey and then to enhance the remaining neutralized urine to introduce scents that serve as an attractant for the intended prey.

It is another object of the present invention to provide a method for collecting, neutralizing, and enhancing urine from non-predatory, non-prey species for use as attractants in jurisdictions where use of prey (deer) urine has been banned to contain the spread of Chronic Wasting Disease. The neutralizing process leaves numerous compounds and proteins remaining in the neutralized fluid which impart natural variations in the perceived scent of the enhanced attractant compared to fully synthesized attractants. Enhancing compounds that simulate a doe in estrus may then be added to produce an attractant having natural variations in the scent that better mimic the natural variations in animal scents.

It is a still further object of the present invention to provide a system and a method for collecting, neutralizing, and enhancing urine so that it may be discharged in a hunting area to serve as an attractant, a repellant, or to be aromatically benign to intended prey in the hunting area that is inexpensive of manufacture, and simple and effective to use.

These and other objects of the present invention are fulfilled by a system for collecting urine from a source, neutralizing the urine in the container with a neutralizing composition to remove or alter odor-generating compounds in the urine that might be perceived as threatening to prey, and then disposing of the neutralized urine in a convenient location proximate to the hunting area without repelling or alarming potential prey that might encounter the neutralized liquid. The neutralizing composition comprises a compound including a weak acidic and oxidizing component and a weak alkaline or basic component, the combination reacting with and neutralizing odor-generating compounds and leaving the resulting neutralized solution with a relatively neutral pH value. The system further includes synthesized natural compounds to impart a scent or odor to the neutralized fluid, including a cover scent, such as pine essence, or an attractant scent or a repellant scent. The associated method may also find utility in mass-producing non-synthetic, CWD-free deer attractants using non-predatory, non-deer urine sources.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the processes, means, and components utilized in this invention are widely known and used in the field of the invention described. Their exact nature or type is not necessary for an understanding and use of the invention by a person skilled in the art, and they will not therefore be discussed in significant detail. Furthermore, the various components shown or described herein for any specific application of this invention can be varied or altered as anticipated by this invention and the practice of a specific application of any element may already be widely known or used in the art by persons skilled in the art. The present invention is described as it applies to its preferred embodiments. It is not intended that the present invention as claimed be limited to the described embodiments.

Human urine primarily comprises water, generally 91 to 96%, and has a pH value ranging from 5.5 to 7.0 with an average of 6.2. It contains an assortment of inorganic salts and organic compounds, including urea, proteins, hormones, and metabolites. Bacteria present in the urine begin decomposition of certain chemicals, namely uric acid, and some proteins in the urine which leads to the formation of ammonia. Ammonia and other proteins specific to humans contained in human urine may be perceived as a predatory species by deer and other prey species causing them to avoid areas where such scents are encountered.

The present invention includes a method for neutralizing and/or converting human urine into an attractant, cover scent or repellent and a system to enable a user to easily use the method. The method may also find utility in partially neutralizing urine from other non-predatory, non-human mammalian species, including primarily domesticated herbivores, and adding attractants for deer to produce an alternative natural-based deer attractant for use in jurisdictions that have banned the use of deer urine due to concerns over the spread of Chronic Wasting Disease (CWD). Chronic Wasting Disease is a central nervous system breakdown that affects white-tail deer populations. It is spread from animal to animal though direct contact or though contact with saliva, urine, feces, blood, and body parts of infected deer. Several states in which CWD is a significant concern have banned the use of deer urine in scents and attractants as a means to control or limit the spread of the disease.

Figure 1:
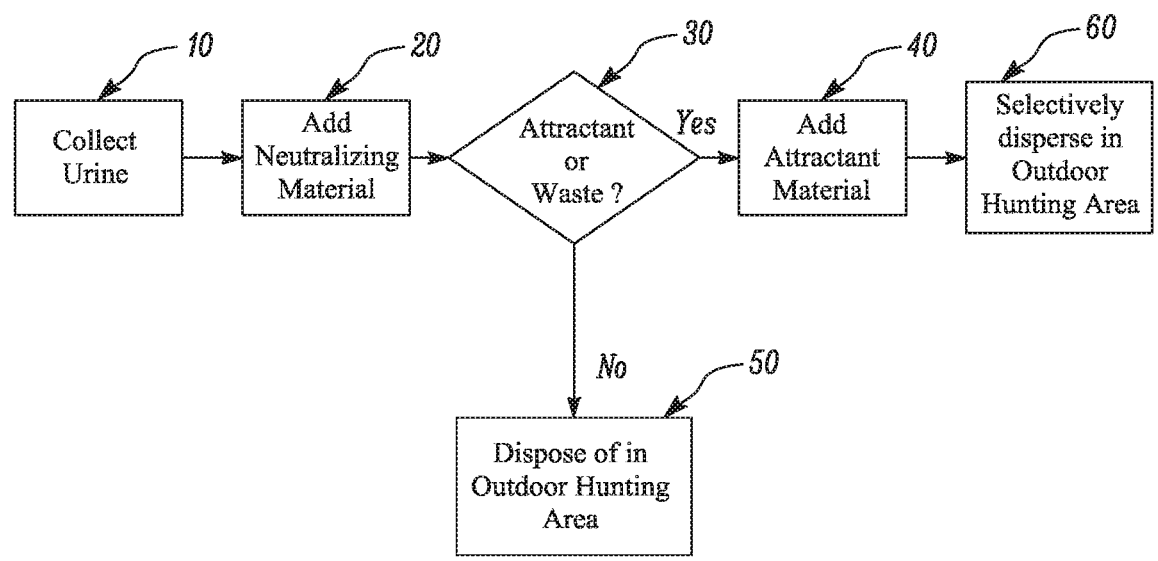
FIG. 1 provides a diagram of the method of treating urine in accordance with the instant invention.

Referring to FIG. 1, urine is first collected in a container 10 where the neutralization step 20 is performed. A neutralizing material comprising a first portion of a weak alkaline or base component and a second portion of a weak acidic component is added. The constituents of the weak alkaline component may be provided as individual ingredients or as part of compounds containing multiple constituents. The weak alkaline component of the neutralizing material may be mixture containing sodium carbonate or sodium bicarbonate and hydrogen peroxide, or it may be a compound which includes an oxidizing constituent, such as sodium percarbonate. The primary object of the weak alkaline component is to react with and neutralize uric acid contained in the urine. Uric acid in urine results from decomposition of purines, organic compounds generally found in higher concentrations in animal meat. The scent of these higher concentrations of uric acid in urine or the ammonia that results from bacterial-driven decomposition when the urine is exposed to air may be perceived by prey species (frequently herbivores) that the urine is of a predatory species. Significantly reducing or eliminating uric acid in the urine reduces the threatening scent perceived by potential prey species. The alkaline neutralization action also destroys some of the bacteria that drive the ammonia generation process, further reducing the level of ammonia and other odors in the neutralized urine that may be perceived as threatening to the prey species.

The constituents of the neutralizing material target uric acid contained in the urine to reduce the emission of ammonia due to bacterial decomposition. Sodium bicarbonate has been shown effective in neutralizing uric acid to limit the formation of ammonia and maintain a neutral pH value. Hydrogen peroxide targets bacteria causing the breakdown of urea contained in the urine that leads to ammonia formation. It also targets some proteins that may be perceived as threatening by the target species. Reducing or eliminating these scents further reduces the chances that the intended prey will perceive a threat when encountering the scent of the neutralized urine. The oxidation of proteins is not complete; some proteins remain and provide a perceptible scent that prey may identify as natural, but non-threatening.

One objective of the neutralization step is to reduce the presence or formation of ammonia in the neutralized urine. Accordingly, weak alkaline solutions containing ammonia (e.g., ammonia, ammonium hydroxide) are not preferred.

The reaction with the weak alkaline component may leave the neutralized fluid with a higher pH level than desired. Incorporating the first portion of a weak acid component into the neutralization material is one way to restore the pH of the neutralized fluid to a generally neutral level. Citric acid may be incorporated as the weak acidic component to lower pH value following reactions by the alkaline component and return the neutralized urine solution to a generally neutral pH value. Other weak acids may also be used, including but not limited to malic acid, acetic acid, phosphoric acid, and formic acid. Consideration should be given of the impact on the scent imparted by the acid selected as some may adversely affect the resulting scent of the neutralized urine. When selecting the acid and base constituents, additional consideration of the effects of discharging the neutralized urine directly into the hunting area (environment) should be taken to avoid adverse environmental effects.

The ratio of the first portion of the weak alkaline component and the second portion of the acidic component may vary depending upon the relative strengths of each, the pH level of the urine to be treated, or a combination of the above. The objective of the neutralization step is to culminate with a neutralized fluid having a generally neutral pH level, typically defined as a pH within the range of 6.5 to 7.5, and a scent or odor that is perceived as generally benign or non-threatening by prey species. In the preferred embodiment, approximately one fluid ounce of neutralizing material mixed in a ratio of three parts sodium percarbonate to one-part citric acid has demonstrated acceptable results when added to as much as sixteen (16) ounces of human urine.

The reaction in the neutralizing step using the preferred materials is generally accompanied by a "fizzing" action. The fizzing action of the neutralizer may be observed through the receptacle or opening. Cessation of the fizzing action indicates the urine has been neutralized. Completion of the neutralization step may also be indicated by a color change of the urine.

Figure 2A:
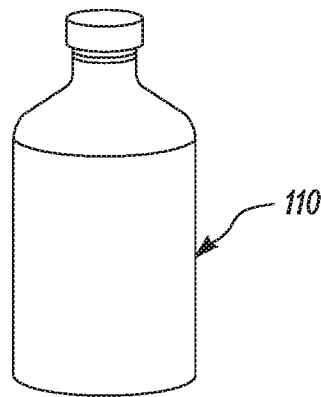
FIGS. 2A-2C illustrate one embodiment of an apparatus used for treating urine in an outdoor hunting area.
Figure 2B:
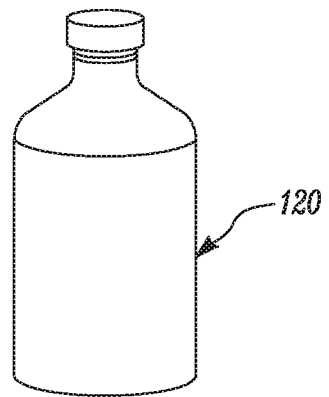
Figure 2C:
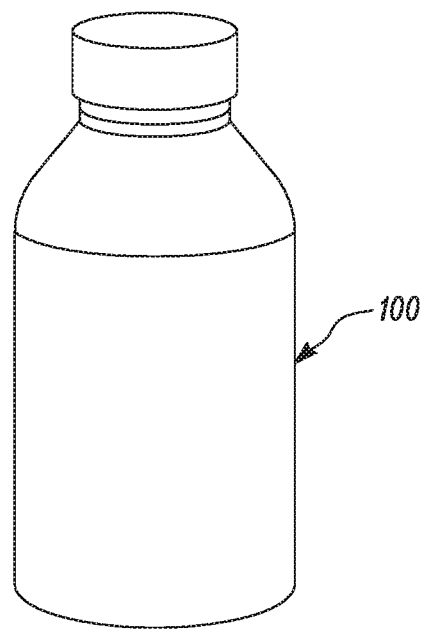

Now referring to FIGS. 1 and 2, the container in a system utilized for hunting applications may include a portable container device 100 also suitable for collecting the urine, such as a bottle, portable urinal, or the like. The neutralizing material may be provided in a neutralizer container 110 in the form of a powder, tablet or liquid that can be easily added into the urine container. The urine, once collected 10 and neutralized 20, may then be selectively 30 dumped onto the ground 50 near the human or hunting location without fear of detection by animal species (dogs, prey, etc.). When the method is used as an alternative urine source for attractants, the neutralized urine is contained and used as an input fluid for enhancement.

If desired (FIG. 2, Ref 30), neutralized urine 20 may optionally be converted or treated with a scent enhancement material 40 to add or modify the scent of the neutralized urine. Providing a scent enhancement container 120 and then mixing the scent enhancement material with the neutralized urine in the portable container device 100 is the preferred method. The scent enhancement material may impart a cover scent, an attractant scent, a deterrent scent, or a combination. The neutralized scented urine may be selectively dispersed 60 as necessary by a hunter. A cover scent would be perceived as something the prey might normally encounter, such as a plant common to the hunting area or another non-threatening animal species, such as fox or fox urine, acorns, cedar trees, apple trees, and the like. An attractant scent would be perceived the scent of a male or female of the prey species. For example, in deer hunting the scent enhancement material may contain synthesized natural compounds of pheromones, hormones, proteins and other chemicals contained in naturally occurring deer urine. A deterrent or repellant scent would be perceived as threatening or undesirable to the target species. Repellant scents are often used by homeowners to repel certain species from gardens or flowers.

The scent enhancement material may comprise synthetic deer urine attractants as are currently available in the market. The use of synthetic deer urine has become popular in the past several years in the US due to the prohibited use of natural deer urine due to the spread of CWD. Several states have banned the use of natural deer urine in attractants giving rise to the popularity of synthetic versions.

The urine neutralization and scent enhancement constituents may be combined into tablet, powder, or liquid form that can be easily combined such that the neutralization and conversion take place at the same time within the receptacle with only one user action. The system may also be offered in a kit form which includes a portable receptacle for collecting the human urine and one or more containers of the neutralization and enhancement materials included therewith. The kits may be customized with a variety of enhancement scents depending on the needs of the intended user and the intended prey.

Care must be taken to ensure stability of the neutralizing materials prior to use. Some combinations of the weak alkaline and acidic components are known to react in the presence of moisture in the air; in such instances, the component ingredients must be kept separated until the time for use. Rather than providing desiccants that would prevent accidental water reactions but generate an additional waste product upon use, providing the constituents in separate tablets, powder packages, or liquid containers eliminates the risk of accidental reactions. In one embodiment, the weak alkaline component was packaged in the portable container device 100 and the acid component combined with scent enhancement material 40 in the scent enhancement container 120 to prevent accidental reactions of the alkaline and acidic components.

The system described is primarily directed to neutralization and treatment of small batches. The average healthy human produces two to three liters of urine per day. For convenience and portability, the system for use in hunting is marketed based on treating one-half liter (approximately 16 ounces) batches of human urine. The method may also be applied to larger scale, mass-production of attractants and cover scents using urine from other animal species and adding attractants for deer to produce an alternative, urine-based deer attractant that is free of CWD. The input urine may be processed in large batches combining the urine output of many animals which yields a generally homogenous scent profile. Alternatively, compartmental control of the input urine based on individual animals may yield slight variations in the scent profiles which may improve effectiveness by avoiding blanketing large hunting areas with a uniform scent profile. Once the urine is neutralized and converted on a large scale, it can then be packaged (bottled) in quantities suitable for distribution and retail sale (e.g. 1-4 fluid ounce containers) similar to fully synthetic attractants on the market today.

From the forgoing it should be noted that a system and method is proposed to neutralize naturally occurring urine of a mammal for disposal without alarming or adverse detection of the scent. Further proposed is a system and method of converting a neutralized (generally bacteria and scent-free) human urine base material into a desired attractant, repellent or cover scent though the addition of an enhancement compound. It should be noted that while the above-described system is generally directed toward converting urine for attracting deer, the same system and methodology may also be used to convert urine from humans or other non-CWD carrying species into an attractant or cover scent for use while hunting bears, coyotes and other prey.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A method for treating urine prior to release in an outdoor area comprising the steps of:
   collecting urine in a container;
   providing a neutralizing material, the neutralizing material further comprising:
     a first compound, the first compound comprising an alkaline constituent; and
     a second compound, the second compound comprising an acid constituent;
   storing the first and second compound separately prior to use;
   adding the first compound to the collected urine, the alkaline constituent reacting with uric acid within the volume of urine in the container when mixed therein to minimize the subsequent formation of ammonia in the volume of urine;
   adding the second compound to the mixture of collected urine and the first compound, the second compound reacting with the mixture to produce a neutralized urine mixture having a generally neutral pH level and sufficiently low concentrations of uric acid and ammonia so that the scent is perceived as non-threatening by potential prey; and
   discharging the neutralized urine mixture into the outdoor area.

2. The method of claim 1, further comprising the step of:
   providing a first compound that further comprises an oxidizing constituent, the oxidizing constituent reacting with and neutralizing bacteria and proteins contained in the urine to minimize the subsequent formation of ammonia in the neutralized urine mixture resulting from bacterial decomposition of urea compounds.

3. The method of claim 2, further comprising the steps of:
   providing a scent enhancement material;
   combining the scent enhancement material and the second compound to create a scent mixture; and
   combining the scent mixture with the mixture of collected urine and the first compound enhancement material with the neutralized urine mixture in the container to produce a neutralized urine mixture having a generally neutral pH level, sufficiently low concentrations of uric acid and ammonia so that the scent is perceived as non-threatening by potential prey, and an enhanced scent.

4. The method of claim 3, wherein the first compound comprises a metal carbonate selected from a group comprising sodium carbonate, potassium carbonate, sodium bicarbonate, and potassium bicarbonate.

5. The method of claim 4, wherein the first compound comprises sodium percarbonate and the second compound comprises citric acid.

6. The method of claim 5, wherein the first compound and the second compound are present in the neutralizing material at a proportion of three to one.

7. The method of claim 3, wherein the scent enhancement material is selected from the group comprising an attractant scent, a cover scent, and a repellant scent.

8. The method of claim 7, wherein the scent enhancement material may include natural or synthesized compounds.

* * * * *